United States Patent
Compton

(10) Patent No.: US 10,674,209 B2
(45) Date of Patent: Jun. 2, 2020

(54) ENHANCED CONTROL OF A DEVICE BASED ON DETECTED USER PRESENCE

(71) Applicant: Charter Communications Operating, LLC, St. Louis, MO (US)

(72) Inventor: Richard A. Compton, Highlands Ranch, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 15/610,234

(22) Filed: May 31, 2017

(65) Prior Publication Data
US 2018/0352294 A1 Dec. 6, 2018

(51) Int. Cl.
| | |
|---|---|
| H04N 21/442 | (2011.01) |
| H04N 21/472 | (2011.01) |
| H04N 21/414 | (2011.01) |
| H04N 21/422 | (2011.01) |

(52) U.S. Cl.
CPC . *H04N 21/44218* (2013.01); *H04N 21/41407* (2013.01); *H04N 21/42207* (2013.01); *H04N 21/47217* (2013.01)

(58) Field of Classification Search
CPC ....... H04N 21/44218; H04N 21/41407; H04N 21/47217; H04N 21/4126; H04N 21/43637; H04N 21/42684; H04N 21/25866; H04N 21/4532; H04N 21/42204; H04N 21/47; H04N 5/44543; H04N 21/43615; H04N 21/258; H04N 21/252; H04N 21/4432; H04N 21/4751; H04N 21/485; H04N 21/42225; H04N 21/42226; H04N 5/4403; G06F 3/0482; G06F 3/0484

USPC .......................................................... 725/10
See application file for complete search history.

(56) References Cited

U.S. PATENT DOCUMENTS

| | | | |
|---|---|---|---|
| 8,577,354 B2 | 11/2013 | Mathews | |
| 8,655,345 B2 | 2/2014 | Gold | |
| 8,855,622 B2 | 10/2014 | Gold | |
| 8,924,999 B1* | 12/2014 | Santangelo | ...... H04N 21/25875 725/10 |
| 9,060,011 B2 | 6/2015 | Gold | |

(Continued)

OTHER PUBLICATIONS

Costello, Sam, "Software & Apps", Mar. 15, 2017, pp. 1.

*Primary Examiner* — Cynthia M Fogg
(74) *Attorney, Agent, or Firm* — Armis IP Law, LLC

(57) ABSTRACT

According to one configuration, a wireless station monitors for presence of wireless communications transmitted in a subscriber domain (monitored region) to identify which of one or more communication devices assigned to the subscriber domain are present in the monitored region. In response to detecting presence of a particular communication device, a mapping resource maps an identity of the communication device and/or corresponding user of communication device to configuration settings (such as a personalized content guide) assigned to the corresponding user of the communication device. The playback device displays the personalized content guide and corresponding control options on a display screen of the playback device to the user. The user then operates a remote control device (which is separate from the communication device) to control selection of options in the displayed personalized content guide of the user.

20 Claims, 11 Drawing Sheets

(56) References Cited

U.S. PATENT DOCUMENTS

| | | | | |
|---|---|---|---|---|
| 2005/0096043 A1* | 5/2005 | Haberman | ............... | H04W 4/06 |
| | | | | 455/422.1 |
| 2010/0205628 A1* | 8/2010 | Davis | ................ | H04M 1/72533 |
| | | | | 725/25 |
| 2011/0086631 A1* | 4/2011 | Park | .................... | H04M 1/7253 |
| | | | | 455/419 |
| 2011/0223862 A1* | 9/2011 | Satoh | ...................... | G08C 17/00 |
| | | | | 455/41.2 |
| 2014/0006347 A1* | 1/2014 | Qureshi | .................. | G06F 21/10 |
| | | | | 707/621 |
| 2014/0067828 A1* | 3/2014 | Archibong | ......... | H04L 65/4084 |
| | | | | 707/748 |
| 2014/0152899 A1* | 6/2014 | Newell | .................... | H04N 5/44 |
| | | | | 348/734 |
| 2014/0181639 A1* | 6/2014 | Lund | ...................... | H04W 4/21 |
| | | | | 715/234 |
| 2015/0281323 A1 | 10/2015 | Gold | | |
| 2017/0084170 A1* | 3/2017 | Zhou | ...................... | G08C 17/02 |

* cited by examiner

ENHANCED CONTROL OF A DEVICE BASED ON DETECTED USER PRESENCE

BACKGROUND

Conventional techniques of controlling a set top box have advanced over the years. For example, infrared remote control devices have long been used to control a set top box. The obvious benefit of the infrared remote control device is that a respective user sitting on a couch need not get up from his current sitting position to physically press a button of the set top box to perform an operation such as change the channel. Instead, as is well known, to control a target device such as a television, the user presses one or more buttons on the infrared remote control device. The infrared remote control device wirelessly transmits the control messages corresponding to the pressed buttons to the set-top box, which then executes the received commands.

Ever since mobile communication devices such as cellular phones have become ubiquitous, they have been more often used to remotely control different types of target devices. For example, a conventional remote control application enables a respective user of a mobile communication device to input commands to a display screen of the mobile communication device to control a respective set-top box and the playback of content on a remote display screen. Typically, the mobile communication device supports WiFi™ connectivity. In such an instance, a user executes an application on the mobile communication device to control the set-top box. The executed application establishes a WiFi™ connection with the set-top box to communicate commands selected by the user from the display screen of the mobile communication device.

Accordingly, using a mobile communication device, and without leaving the comfort of sitting on a respective couch, the user is able to operate the mobile communication device to control a remote device such as a set-top box.

BRIEF DESCRIPTION OF EMBODIMENTS

In contrast to conventional techniques, embodiments herein provide novel ways of providing enhanced remote control capabilities based on knowing identities of one or more persons in a monitored region.

More specifically, in one embodiment, a content playback system according to embodiments herein includes a wireless communication monitoring station, a display management resource, and a display screen. During operation, the wireless station monitors for presence of wireless communications transmitted in the subscriber domain (such as a monitored region therein) to identify whether one or more communication devices assigned to the subscriber domain are present in the monitored region.

In response to detecting presence of a communication device in a monitored region, the display management resource maps an identity of the communication device and/or corresponding user of the communication device to configuration settings assigned to the corresponding user/communication device.

In one embodiment, the configuration settings assigned to the user includes a personalized content guide of control settings indicating one or more selectable control options pertinent to the corresponding user. In response to detecting presence of the corresponding user, the display management resource (of the playback device such as a set top box) displays the personalized content guide and corresponding control options on the display screen to the user. The user then operates a separate remote control device to control playback of respective content on the display screen.

Alternatively, the configuration settings assigned to the user indicate which of one or more operations to perform in response to receiving given input from a user assigned the configuration settings.

Accordingly, embodiments herein provide enhanced remote control capability over conventional techniques. That is, instead of requiring the respective user to manually perform a control operation indicating his identity to a display management resource, the presence of the user in the monitored region of the subscriber domain is known by detection of supplemental wireless communications (broadcast or targeted communications) from the particular communication device possessed by the user.

In accordance with further embodiments, display and/or execution of the control options associated with configuration settings of a corresponding user facilitates wireless control of playing back content on the display screen via selection of buttons on the remote control device operated by the user. For example, as previously discussed, the identity of the user operating the remote control device is known via prior transmission of the wireless communications by the user's mobile communication device (such as the user's cell phone, a personal computer, etc.).

In accordance with one embodiment, via further input such as detection of the user selecting one or more buttons on the remote control device, the display management resource of the playback device is notified of which of one or more control options to execute to control the playback of content on the display screen. The display management resource executes the selected control option in accordance with the configuration settings.

In one embodiment, the playback device (such as a set-top box) includes the display management resource and the wireless station. The playback device, the communication device possessed and operated by the user, and the remote control device are disparately located with respect to each other. The detected presence of the mobile communication device and identification of the respective user enables the display management resource of the playback device to provide personalized control capability to the user.

Detection of the identity of the user can be performed in any suitable manner. In one embodiment, the identity detected by the wireless station is a network address (unique identifier value) assigned to the communication device. The wireless station retrieves and/or identifies the network address (present in a known data field) from a wireless communication transmitted by the communication device. The display management resource (or mapping resource) maps the identity (network address) of the communication device to a respective user and/or configuration settings associated with the user. The display management resource then executes the configuration settings assigned to the user as discussed herein.

Note that the wireless station can be configured to passively monitor the wireless communications transmitted in the monitored region of the subscriber domain. In one embodiment, the communication device transmits one or more of the wireless communications as targeted communications to or through a destination communication device (such as a wireless access point other than the wireless monitor station) in the subscriber domain. In such an instance, the wireless station eavesdrops on the communications transmitted from the communication device to identify presence of the communication device and user. In a manner as previously discussed, the wireless station analyzes the network address of the detected wireless communications to determine the identity of a respective user in the monitored region.

Alternatively, or additionally, the communication device can be configured to repeatedly transmit (broadcast) wireless communications (such as beacons) in the monitored region to purposefully provide notification of the user and/or communication device's presence. In other words, the user of the communication device can configure it to transmit (such as once every n milliseconds) wireless beacons to notify the wireless station of its presence, which enables enhanced control of the playback device as discussed herein.

In accordance with further embodiments, as previously discussed, the wireless station may be continuously powered to detect presence of the user in the monitored region based upon detecting presence of the mobile communication device in the monitored region. The playback device may initially be in an unpowered state. Even though a respective display screen is powered off, the wireless station monitors and detects presence of the user.

Assume that the user operates the remote control device to transition the playback device from the unpowered (or deactivated) state to a powered (or activated) state to play back respective content. Based on knowing an identity of the user present in the monitored region, and in response to receiving first control input such as to activate the playback device and/or display management resource, the display management resource can be configured to initiate activation of a corresponding display screen as well as initiate display of the user's personalized content guide and respective control options on the display screen to the user.

Thus, in contrast to conventional techniques in which only a generic content guide is displayed when the user first activates a set top box and display screen, embodiments herein include displaying a personalized content guide of the detected user when the user activates the set-top box's display screen.

Subsequent to display of the personalized content guide on the display screen, the user provides further input to the remote control device to control playback of content. For example, assume that the user uses the remote control device to select a control option from the multiple control options displayed in the personalized content guide on the display screen. In response to receiving this additional control input from the remote control device such as selection of a control option in the displayed personalized content guide, the playback device controls play back of respective content on the display screen in accordance with the selected control option.

In accordance with further embodiments, there may be multiple mobile communication devices present in the monitored region. Each of the multiple mobile communication devices transmits respective wireless communications; each wireless communication includes a unique network address assigned to the respective mobile communication device sending the communication.

Via analyzing the wireless communications, the wireless station detects presence and identities of the multiple communication devices and corresponding users. In a manner as previously discussed, each user of a respective communication device is assigned corresponding unique configuration settings.

In accordance with still further embodiments, the wireless station can be configured to monitor a respective signal strength associated with each received wireless communication. The received signal strength indicates which of the multiple possible users (such as a first user, second user, third user, etc.) associated with the detected communication devices (such as a first respective communication device, a second respective communication device, a third respective communication device, etc.) is nearest to the wireless station.

In one embodiment, it is assumed that the nearest detected user (or communication device) of highest signal strength is in control of displaying respective content on the display screen for viewing. In response to detecting that the strongest wireless signal strength is received from the second device assigned to the second user, the display management resource maps the identity (such as unique network address) of the second communication device and second user to respective configuration settings assigned to the second user. In such an instance, the display management resource uses the configuration settings assigned to the second user to perform an operation such as display the second users personalized content guide (and corresponding control options, messages, etc.) on the display screen for the second user.

In a similar manner, if the third communication device is detected as being closest to the wireless station, the display management resource 140 would perform an operation such as display the third user's personalized content guide (and corresponding control options, messages, etc.) on the display screen for the third user.

In accordance with further embodiments, it may not be desirable to control which of multiple personalized content guides to display on a respective display screen based on the received signal strength or there may not be an appreciable amount of difference between the signal strength of receiving a respective wireless communication from a first communication device with respect to a signal strength of receiving a respective wireless communication from a second communication device.

In such an instance, it may be desirable to use a predetermined priority list to determine which of the multiple configuration settings to use. For example, the wireless station may detect presence of multiple communication devices including a first communication device, the second communication device, the third communication device, etc., previously used in the monitored region or subscriber domain. As previously discussed, via the wireless communications, the wireless station detects identities of multiple users and/or respective communication devices in the monitored region. The display management resource uses the priority list to identify which of the users in the monitored region is assigned a highest priority. In response to identifying that the second user operating the second communication device is ranked highest in priority amongst the multiple users, the display manager resource utilizes the configuration settings assigned to the second user to control playback of content.

In yet further embodiments, rather than identifying which of multiple users is assigned a highest priority, embodiments herein can include using a combination of identities associated the multiple users to determine which of multiple personalized content guides to display on the respective display screen. For example, assume that the wireless station receives wireless communications from multiple communication devices. The display management resource maps a combination (group) of identities (of users) to corresponding group configuration settings assigned to the combination of identities. The display management resource then utilizes the configuration settings assigned to the group to execute control options in accordance with the configuration settings.

Accordingly, embodiments herein executing configuration settings for a detected individual or execution configuration settings assigned to a group of detected individuals.

These and other more specific additional embodiments are disclosed herein as further discussed below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a device. The instructions, when executed by computer processor hardware, cause the computer processor hardware (such as one or more processor devices) to: monitor a region for wireless communications to identify presence of a communication device in the monitored region; map an identity of the communication device to configuration settings of a user of the communication device; and utilize the configuration settings to control a playback device, the playback device disparately located with respect to the communication device, the configuration settings facilitating control of the playback device by the user.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling a remote media system. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, a wireless station monitors for presence of wireless communications transmitted in a subscriber domain (monitored region) to identify which of one or more communication devices assigned to the subscriber domain are present in the monitored region. In response to detecting presence of a particular communication device, a display management resource maps an identity of the communication device and/or corresponding user of communication device to configuration settings (such as a personalized content guide or other suitable playback information) assigned to the corresponding user in the monitored region. The display management resource of the playback device displays the personalized content guide and corresponding control options on a respective display screen to the user. The user then operates a remote control device (which is separate/disparate from the user's communication device providing the unique identifier value such as network address information) to control selection of options in the user's displayed personalized content guide. These and additional embodiments are further discussed below.

Figure 1:
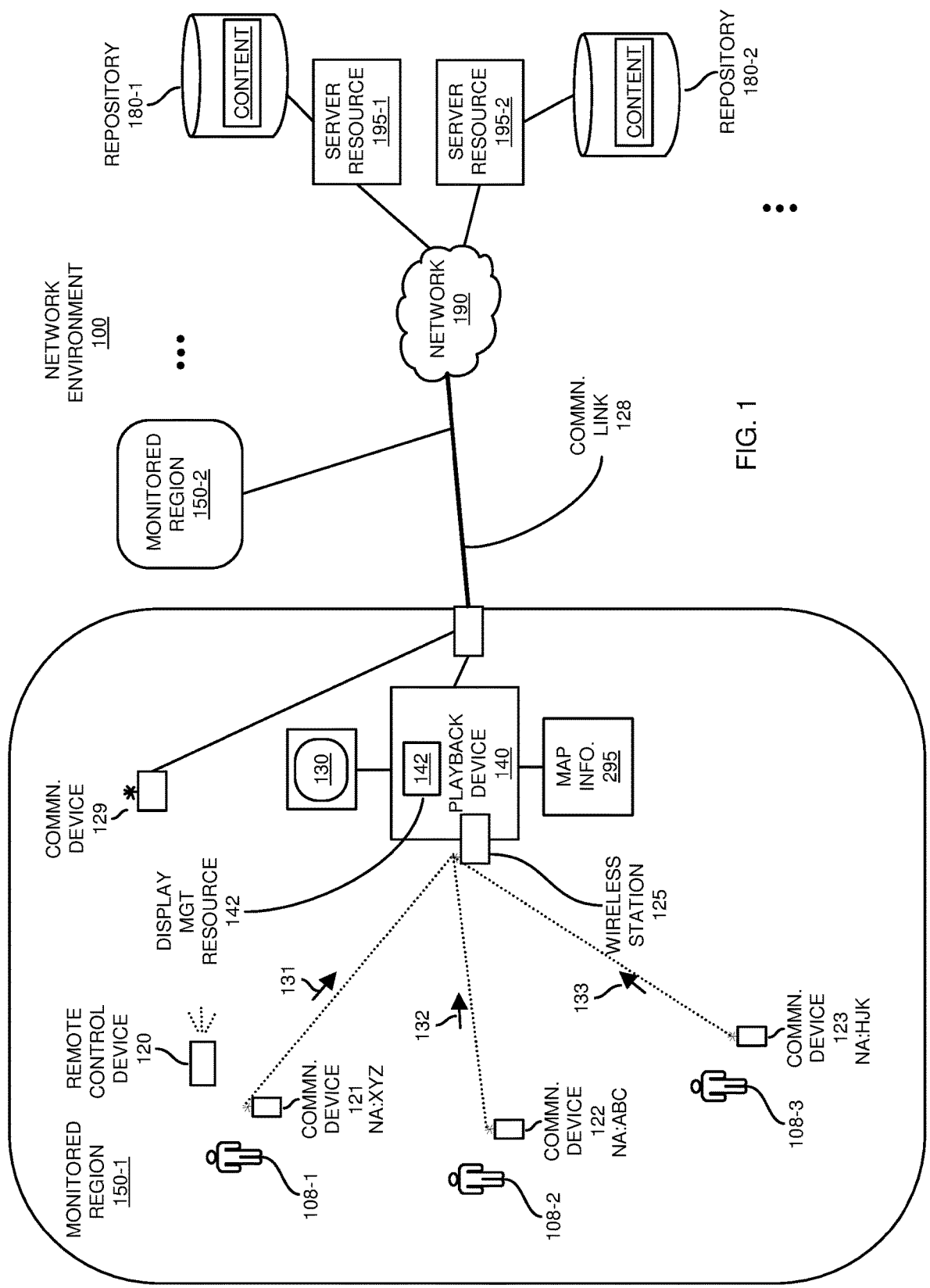
FIG. 1 is an example diagram illustrating control of a playback device according to embodiments herein.

Now, more specifically, FIG. 1 is an example diagram illustrating control of a playback device and corresponding display screen according to embodiments herein.

As shown, a content playback system in a monitored region 150-1 of a network environment 100 includes a wireless communication monitoring station 125, playback device 140 (such as a set top box) coupled to receive content over a shared communication link 128, a display management resource 142 (hardware, software, etc., such as associated with a set top box), a display screen 130 (such as a television).

In one embodiment, the network environment 100 is a cable network environment in which each of multiple subscriber domains (similar to subscriber domain 150-1) is able to receive/transmit communications over the shared communication link 128.

The monitored region 150-1 represents all or a portion of a respective first subscriber domain (such as a first household) in which one or more of the users 108-1, 108-2, 108-3, etc., reside; monitored region 150-2 represents all or a portion of a respective second subscriber domain (such as a second household) in which one or more other users reside; and so on.

Each of the subscriber domains shares use of the communication link 128 to retrieve content.

Further in this example embodiment, the monitored region 150-1 includes multiple ways of communicating over communication link 128. For example, the monitored region 150-1 includes communication device 129 (such as a wireless access point), providing access over network 190 to one or more remote networks such as the Internet, content distribution networks (such as networks conveying broadcast channels, video-on-demand channels, etc.).

Accordingly, playback device 140 such as a set-top box is communicatively coupled to the communication link 128 to receive content from any of one or more sources such as server resource 195-1, server resource 195-2, etc.

During operation, the wireless station 125 monitors for presence of wireless communications 131, 132, 133, etc., transmitted in the subscriber domain (monitored region 150-1) to identify whether one or more respective communication devices 121, 122, 123, etc., assigned for use in the subscriber domain are present in the monitored region 150-1. Note that the wireless station 125 can be located at any suitable location such as in the playback device 140, in a respective communication device, etc.

In one embodiment, the monitored region 150-1 represents a region such as a family room in which one or more respective users resides.

Figure 2:
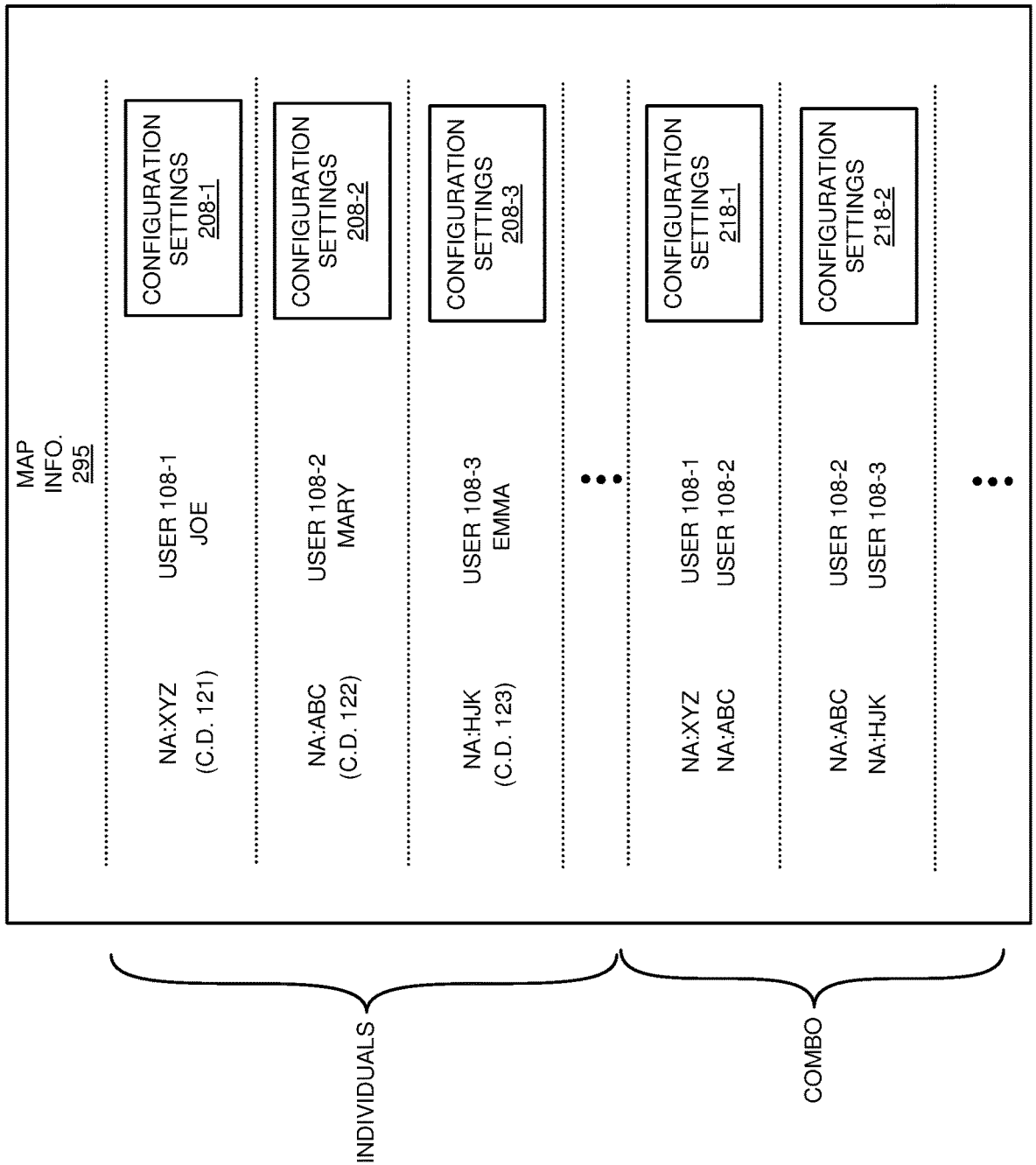
FIG. 2 is an example diagram illustrating map information according to embodiments herein.

As further described herein, in response to detecting presence of a particular communication device such as communication device 121, using map information 295 in FIG. 2, the display management resource 142 of playback device 140 maps an identity of the communication device 121 and/or corresponding user 108-1 of the communication device 121 to respective configuration settings 208-1 assigned to the corresponding user 108-1.

FIG. 2 is an example diagram illustrating map information according to embodiments herein.

As shown, the map information 295 includes identities of one or more communication devices that are potentially present in the monitored region 150-1. Each user registers use of their device in the monitored region 150-1.

In this example embodiment, the map information 295 indicates that the communication device 121 is assigned network address XYZ and is typically possessed and used by user 108-1 (Joe). Further, the map information 295 indicates that the configuration settings 208-1 are assigned to user 108-1. In one embodiment, user 108-1 produces configuration settings 208-1.

The map information 295 further indicates that the communication device 122 is assigned network address ABC and is typically possessed and used by user 108-2 (Mary). Further, the map information 295 indicates that the configuration settings 208-2 are assigned to user 108-2. In one embodiment, user 108-2 produces configuration settings 208-2.

The map information 295 further indicates that the communication device 123 is assigned network address HJK and is typically possessed and used by the user 108-3 (Emma). Further, the map information 295 indicates that the configuration settings 208-3 are assigned to user 108-3. In one embodiment, user 108-3 produces configuration settings 208-3.

In this example, the configuration settings 208-1 assigned to the user 108-1 include or indicate settings such as a personalized content guide including one or more selectable control options pertinent to the corresponding user 108-1; the configuration settings 208-2 assigned to the user 108-2 include or indicate settings such as a personalized content guide including one or more selectable control options pertinent to the corresponding user 108-2; the configuration settings 208-3 assigned to the user 108-3 include or indicate settings such as a personalized content guide including one or more selectable control options pertinent to the corresponding user 108-3; etc.

Accordingly, each of the users can be assigned a respective personalized content guide to retrieve and view content on display screen 130. Note that the configuration settings can be any suitable settings associated with a respective user.

Note further that embodiments herein also can include keeping track of configuration settings associated with groups of users. For example, the grouping of users 108-1 and user 108-2 represents a first unique group of users; the grouping of users 108-2 and user 108-3 represents a second unique group of users; and so on.

In this instance, the map information 295 further indicates that the combination of communication devices 121 and 122 is assigned configuration settings 218-1; the map information 295 further indicates that the combination of communication devices 122 and 123 is assigned configuration settings 218-2; and so on.

Referring again to FIG. 1, in this example embodiment, in response to detecting presence of a corresponding user such as user 108-1, the display management resource 142 displays a rendition of a personalized content guide and corresponding control options (as derived from the configuration settings 208-1) on the display screen 130 for the user 108-1.

As further described herein, the user 108-1 then operates a separate remote control device 120 to control playback of respective content on the display screen 130.

Accordingly, embodiments herein provide enhanced remote control capability over conventional techniques. That is, instead of requiring the respective user 108-1 to perform an operation indicating his identity, the presence of the user 108-1 in the monitored region 150-1 of a respective subscriber domain is known by detection of wireless communications 131 (such as broadcast or targeted communications) from the particular communication device 121 assigned to the user 108-1.

In accordance with further embodiments, display of control options in the respective user's personalizes content guide as indicated by configuration settings 208-1 facilitates wireless control of playing back content on the display screen 130 via selection of buttons on the remote control device 120 operated by the user 108-1.

More specifically, as previously discussed, the identity of the user 108-1 operating the remote control device 120 is known via initial detected transmission of the wireless communications 131 by the user's mobile communication device 121 (such as the user's cell phone, a personal computer, etc.).

Via further input (such as one or more received wireless commands) such as detection of the user selecting one or more buttons on the remote control device 120, the display management resource 142 of the playback device 140 is notified of which of one or more control options in the user's personal content guide on the display screen 130 to execute to control the playback of content on the display screen 130.

In accordance with further example embodiments, the playback device 140 (such as a set-top box) includes the display management resource 142 and the wireless station 125. The playback device 140, the communication device 121 of the user 108-1, and the remote control device 120 are optionally disparately located with respect to each other. Accordingly, the detected presence of a particular mobile communication device and/or identification of the respective user possessing the device enable the display management resource 142 of the playback device 140 to provide personalized control capability to the user 108-1.

Detection of an identity of the user and corresponding communication device can be performed in any suitable manner. In one embodiment, the identity detected by the wireless station 125 is a network address (unique identifier value) assigned to the respective communication device. The respective communication device includes and transmits its assigned network address in each communication wirelessly transmitted in the monitored region 150-1.

The wireless station 125 analyzes received wireless communications to retrieve the network address from one or more wireless communication transmitted by a corresponding communication device. Using the network address, the display management resource 142 (or mapping resource) maps the identity (network address) of the corresponding communication device to a respective user and/or configuration settings associated with the user in a manner as previously discussed. The display management resource 142 then executes and/or displays the configuration settings assigned to the user on display screen 130.

Note that the wireless station 125 can be configured to passively monitor the wireless communications transmitted in the monitored region 150-1 of the subscriber domain. For example, a respective communication device can be configured to transmit one or more of the wireless communications as targeted communications to or through a destination communication device 129 (such as a wireless access point other than the wireless station 125) in the subscriber domain. In one embodiment, the wireless station 125 eavesdrops on the communications transmitted from a respective communication device. That is, the wireless station 125 analyzes wireless messages (such as communications from the communication device 121 to the communication device 129) even though the messages are not necessarily transmitted to the wireless station 125.

In a manner as discussed herein, the wireless station 125 analyzes the network address of the detected wireless communications to determine the identity of a respective user operating the detected communication device in the monitored region.

Alternatively or additionally, note that the communication device can be configured to repeatedly transmit (such as broadcast) wireless communications (such as beacons) in the monitored region 150-1 to purposefully provide notification of its presence. In other words, the user of a corresponding communication device or other suitable resource can configure a respective content to transmit (such as once every n milliseconds) wireless beacons to notify the wireless station of its presence, which enables enhanced control of the playback device 140 as discussed herein.

In accordance with further embodiments, as previously discussed, the wireless station 125 may be continuously powered and detect presence of a respective user in the monitored region 150-1 based upon presence of the corresponding mobile communication device in the monitored region 150-1. Note that the playback device 140 may initially be in an unpowered state. Even though a respective display screen 130 is powered off, the wireless station 125 detects presence of the user 108-1.

Assume that the user 108-1 operates the remote control device 120 (such as by pressing a power on button) to transition the playback device 140 from the unpowered (or deactivated) state to a powered (or activated) state to play back respective content. Based on knowing an identity of the user 108-1 present in the monitored region 150-1, and in response to receiving first control input (such as pressing the power on button) such as to activate the playback device and/or display management resource 142, the display management resource 142 initiates activation of a corresponding display screen 130 as well as initiates display of the user's personalized content guide and respective control options on the display screen 130 to the user 108-1.

Thus, in contrast to conventional techniques in which only a generic content guide is displayed when the corresponding user first activates a set top box and display screen 130, embodiments herein include displaying a personalized content guide of the respective user of the communication device 121 when the corresponding user activates the set-top box's display screen 130.

Subsequent to display of a personalized content guide on the display screen 130, the respective user provides further input from the remote control device to control playback of content. For example, assume that the user uses the remote control device 120 to select a control option from the multiple control options displayed in the personalized content guide on the display screen 130. In response to receiving this additional control input from the remote control device 120 such as selection of a control option in the display personalized content guide, the playback device controls play back of respective content on the display screen 130 in accordance with the user selected control option.

In accordance with further embodiments, note that there may be multiple mobile communication devices present in the monitored region 150. In such an instance, each of the multiple mobile communication devices 121, 122, 123, etc., transmits respective wireless communications 131, 132, 133, etc. As previously discussed, each wireless communication includes a unique network address assigned to the respective mobile communication device. Via analyzing the received wireless communications, the wireless station 125 detects different identities of the multiple communication devices present in the monitored region. In a manner as previously discussed with respect to FIG. 2, each user of a respective communication device is assigned corresponding unique configuration settings.

Figure 3:
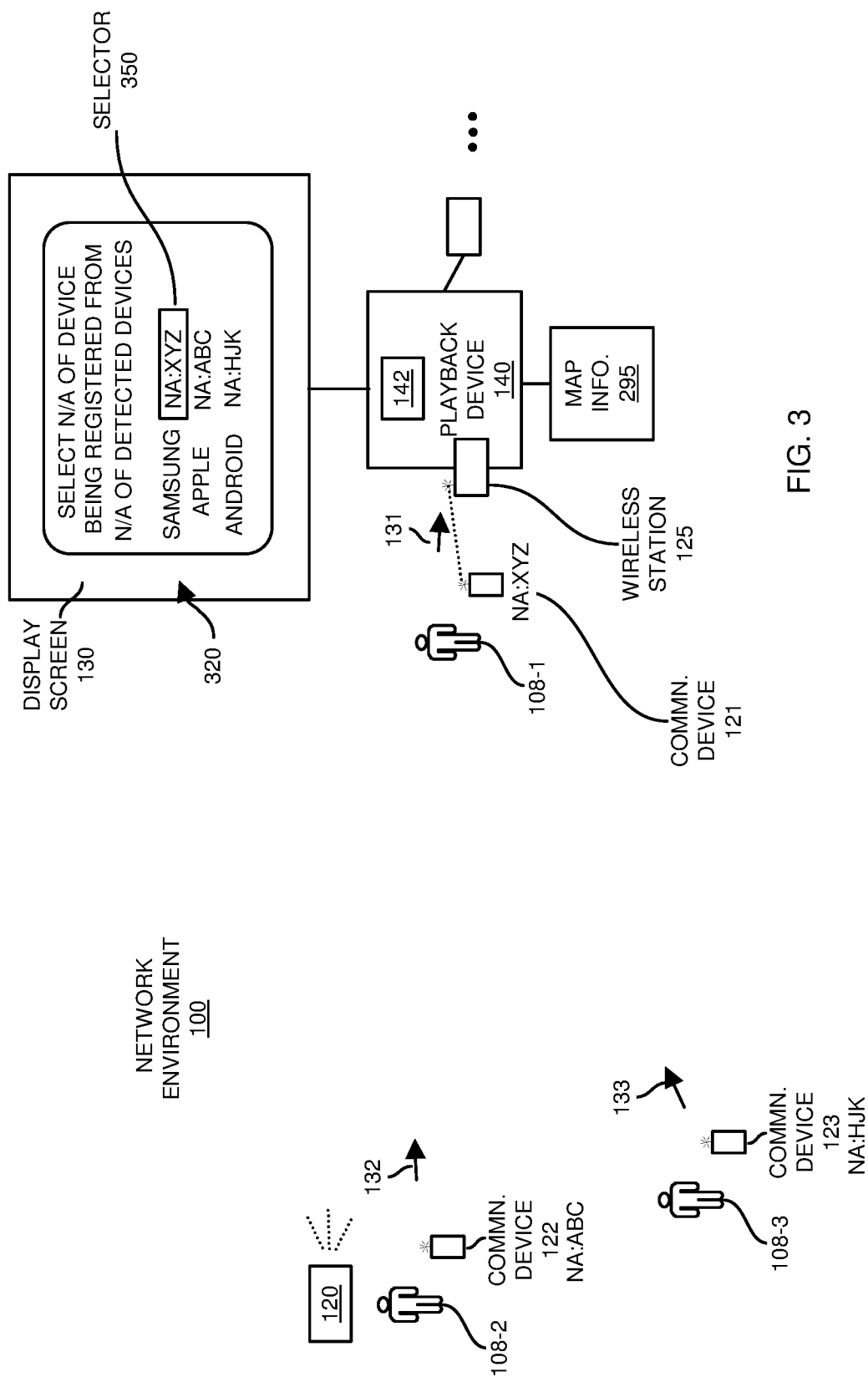
FIG. 3 is an example diagram illustrating registration of a respective communication device and user according to embodiments herein.

FIG. 3 is an example diagram illustrating registration of a respective communication device and user according to embodiments herein.

In this example embodiment, each respective user registers there communication device for use in monitored region 150-1. Prior to monitoring the wireless communications 131 in monitored region 150-1, assume that the display management resource 142 or other suitable resource provides notification to the user 108-1 to place the communication device 121 at a particular location such as within a predetermined distance with respect to the wireless monitor station 125. As previously discussed, the communication device 121 transmits wireless communications 131.

The wireless monitor station 125 receives the wireless communications 131 from the communication device 121. The wireless message in wireless communications 131 includes a unique identifier value (such as network address XYZ) assigned to the communication device 121.

Subsequent to receiving the wireless communications 131, the display manager resource 142 of the playback device 140 initiates display of a notification 320 on display screen 130 of the playback device 140. As shown, the notification 320 indicates detection of the unique identifier value XYZ as detected in wireless communication 131.

In a similar manner, the wireless station 125 detects communications 132 and 133 from respective communication devices 122 and 123. Based on detection, the display management resource 142 displays network addresses ABC and HJK.

In this case, mobile communication device 121 is being registered. In one embodiment, as previously discussed, the wireless station 125 monitors a respective signal strength of receiving the wireless communications from the different communication devices. Based on the received signal strength, the display manager resource 142 initiates display of the different network addresses assigned to the communication devices in notification 320. Because the communication device 121 (device being registered) is within one or 2 feet of the wireless station 125, the wireless station 125 detects that the wireless communications 131 are received at the highest signal strength in comparison to the other communications 132 and 133. Accordingly, the display manager resource 142 displays the network address XYZ highest in the respective list of network address as a notification 320.

In one embodiment, a portion of the respective network address indicates a particular manufacture of the communication device that was detected. Accordingly, if desired, the display manager resource 142 can be configured to display the notification 320 to include manufacture information indicating the manufacture of the respective communication device. For example, the communication device 121 is a Samsung™ device, the communication device 122 is Apple™ device; and so on.

Displaying the manufacture information may provide a clue as to which of the multiple network addresses are assigned to the communication device being registered.

Further in the registration process, the user 108-1 provides input to the playback device 140 indicating which of the multiple network addresses in the notification 320 is assigned to the communication device 121. For example, the user 108-1 operates the remote control device 128 to move selector 350 on the display screen 130 over network address XYZ. The user then selects the OK button on the remote control device 120 to indicate that the communication device 121 being registered corresponds to the network address of XYZ.

In addition to selecting the network address assigned to the communication device 121, the user 108-1 inputs further information such as a username, preferred settings for a personalized content guide, control settings of buttons on the remote control device 120, etc. The display manager resource 142 creates the entry and map information 295 to include the network address XYZ, name of user, as well as corresponding configuration settings 208-1 associated with the user 108-1.

In a similar manner, the display manager resource 142 receives input from each of the multiple communication devices to create an association between the communication devices/users and the corresponding configuration settings to be used for the particular user.

Accordingly, in one embodiment, the display management resource 142: i) receives configuration settings associated with the user 108-1; ii) receives selection of the notification (network address XYZ) amongst multiple network address notifications, each of which corresponds to receipt of a respective wireless communication from a different communication device. Selection of the network address XYZ indicates that configuration settings 208-1 associated with the user 108-1 are to be assigned to the unique identifier value (network address ABC). As previously discussed, in response to receiving selection of the network address XYZ, the display management resource 142 assigns the unique identifier value (network address ABC) to the configurations settings 208-1. Each device is registered in a similar manner.

Figure 4:
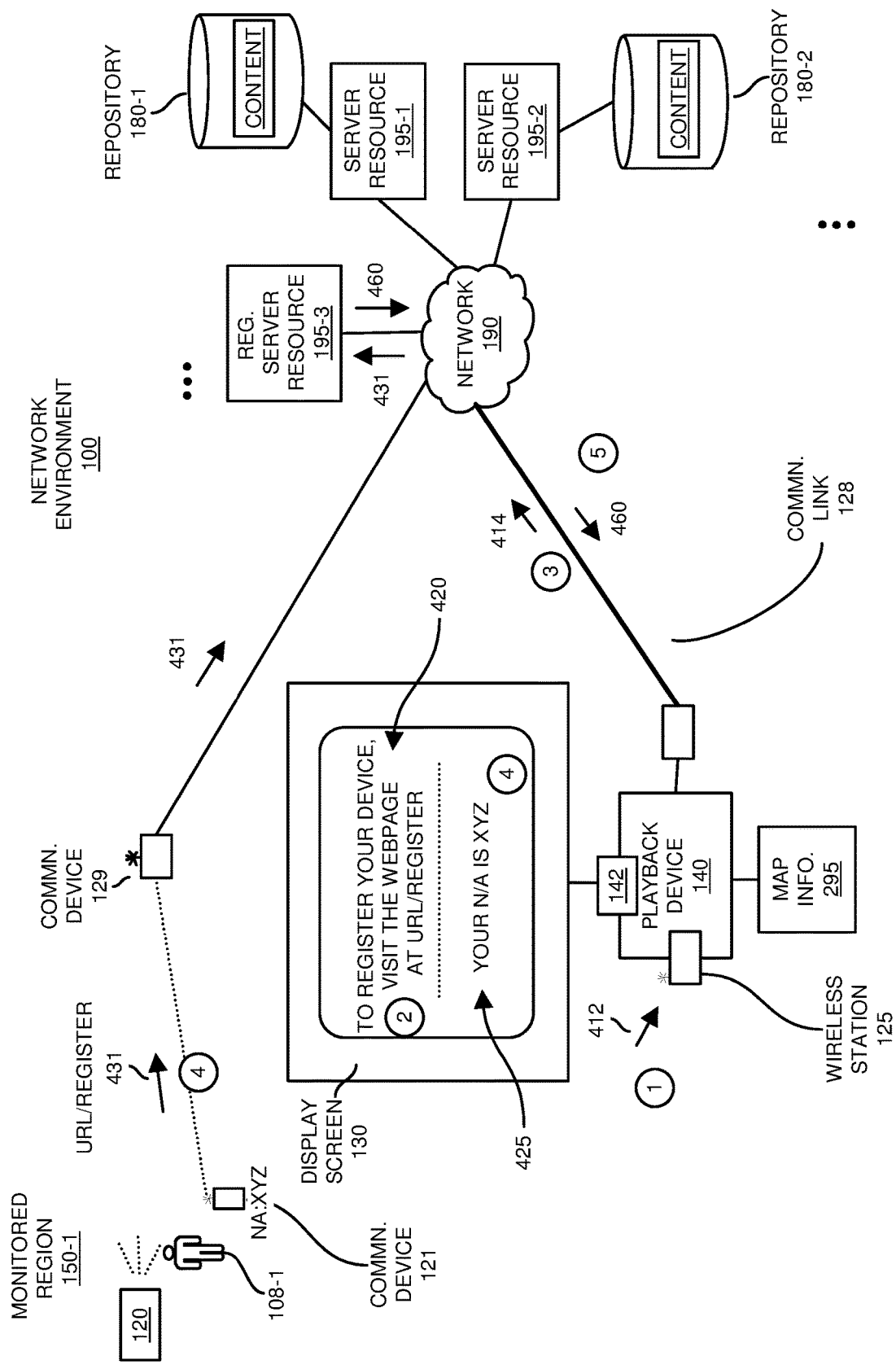
FIG. 4 is an example diagram illustrating registration of a respective communication device and user according to embodiments herein.

FIG. 4 is an example diagram illustrating registration of a respective communication device and user according to embodiments herein.

In accordance with further embodiments, to register a respective device, note that the display manager resource 142 can be configured to initiate display of notification 420 on the display screen 130 for viewing by the user 108-1. For example, in one embodiment, the user 108-1 operates the remote control device 120 to send a control communication 412 to the playback device 140 indicating to operate in a registration mode in which the user 108-1 is able to register his respective communication device with the playback device 140.

In this example embodiment, the notification 420 indicates that the user 108-1 can register his respective device by visiting the webpage URL/register. In one embodiment, the service provider providing the playback device 140 (such as set top box) for use in the monitored region 150-1 received feedback from the registration server resource 195-3 to support registration of devices in the monitored region 150-1.

In addition to displaying the respective notification 420 on the display screen 130, the playback device 140 transmits message 414 to the registration server resource 195-3 indicating an identity of the playback device 140 as well as that a user is requesting to perform registration.

To register a respective device 121, subsequent to display of the notification 420 on the display screen 130, the user 108-1 operates the communication device 121 to send wireless communication 431 through the communication device 129 to registration server resource 195-3. The wireless communication 431 can be a simple communication such as a request to receive a corresponding webpage (the specific webpage as indicated in the notification 420 on display screen 130) from the registration server resource 195-3. The wireless communication 431 includes the source network address XYZ assigned to the communication device 121.

Prior to the communication device 121 communicating the wireless communication 431 to the registration server resource 195-3, recall that the display manager resource 142 of the playback device 140 notifies the registration server resource 195-3 that the user 108-1 has controlled the playback device 140 to be in a registration mode. Accordingly, the registration server resource 195-3 expects to receive a communication from a communication device operated in the monitored region 150-1 to which the playback device 140 resides.

Further in this example embodiment, in response to receiving the message 431 through communication device 129 such as another wireless access point, the registration server resource 195-3 transmits communications 460 to the playback device 140. Note that the registration server resource 195-3 knows a mapping of communication device 129 and playback device 140 and that they reside in the same subscriber domain.

In one embodiment, the message 460 notifies the playback device 140 and more specifically the display manager resource 142 of the network address XYZ assigned to the communication device 121 operated in the monitored region 150-1.

Accordingly, the display manager resource 142 is notified of the network address of the communication device 121 operating in the monitored region 150-1. The display manager resource 142 then initiates display of the notification 425 on the display screen indicating that the communication device 121 (communicating the message 431 to the corresponding network address associated with URL/register) is assigned the network address XYZ.

In a similar manner as previously discussed, the user 108-1 operates the remote control device 120 to produce a personalized content guide or personalized settings. The display management resource 142 then uses the inputted configuration information from the user 108-1 to produce the configuration settings 208-1. The display management resource 142 then associates the configuration settings 208-1 to the communication device 120 assigned network address XYZ and corresponding user 108-1. Upon subsequent use in a manner as previously discussed, the playback device 140 uses the map information 295 to identify how to perform control functions depending on which user is detected in the monitored region 150-1.

Figure 5:
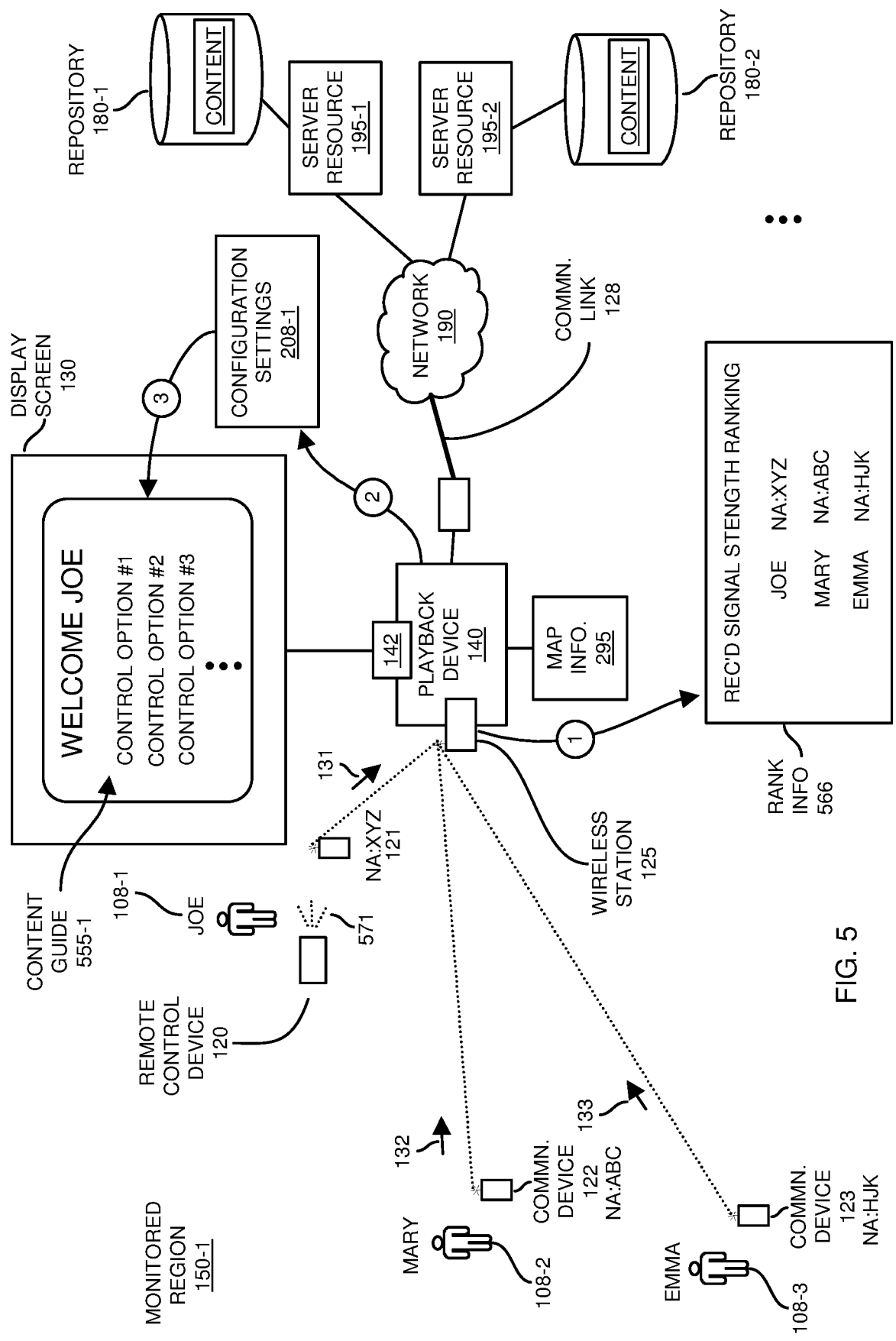
FIG. 5 is an example diagram illustrating detection of a first user in a monitored region and display of a respective personalized content guide associated with the first user according to embodiments herein.

FIG. 5 is an example diagram illustrating detection of a first user in a monitored region and display of a respective personalized content guide associated with the first user according to embodiments herein.

As shown in this example embodiment, user 108-1 possesses communication device 121, user 108-2 possesses communication device 122, user 108-3 possesses communication device 123. Each of the users including user 108-1, user 108-2, and user 108-3 reside in the monitored region 150-1.

Communication device 121 transmits wireless communications 131 (one or more messages) in the monitored region 150-1. The wireless station 125 receives and analyzes the wireless communications 131 to determine that the wireless communications 131 are transmitted by communication device 121 assigned the network address XYZ. In other words, as previously discussed, assume that the the wireless station 125 analyzes data in the received wireless communications 131 and determines that the wireless communications 131 include network address XYZ as a source transmitting the wireless communications 131. The wireless station 125 records a respective wireless signal strength of receiving the wireless communications 131.

Communication device 122 transmits wireless communications 132 (one or more messages) in the monitored region 150-1. The wireless station 125 receives and analyzes the wireless communications 132 and therefore determines that the wireless communications 132 are transmitted by communication device 122 assigned the network address ABC. In this instance, the wireless station 125 analyzes data in the received wireless communications 132 and determines that the wireless communications 132 include network address ABC as a source transmitting the wireless communications 132. The wireless station 125 records a respective wireless signal strength of receiving the wireless communications 132.

Communication device 123 transmits wireless communications 133 (one or more messages) in the monitored region 150-1. The wireless station 125 receives and analyzes the wireless communications 133 and determines that the wireless communications 133 are transmitted by communication device 123 assigned the network address HJK. In other words, the wireless station 125 analyzes data in the received wireless communications 133 and determines that the wireless communications 133 include network address HJK as a source transmitting the wireless communications 133. The wireless station 125 records a respective wireless signal strength of receiving the wireless communications 133.

In accordance with further embodiments, the wireless station 125 or other suitable resource produces rank information 566 indicating a signal strength from which the respective wireless communications are received from the communication devices in the monitored region 150-1.

In this example embodiment, the rank information 566 indicates that the wireless communication 131 received from the user 108-1 (Joe) was higher in signal strength than received wireless communications 132 or received wireless communications 133.

In one embodiment, it is assumed that the user 108-1 is closest in proximity to the wireless station 125, indicating that the user 108-1 is likely controlling operation of playing back content on the display screen 130. In response to detecting that the wireless communications 131 are received at the highest signal strength, the display management resource 142 maps the network address XYZ to configuration settings 208-1 in map information 295 (FIG. 2).

Using the configuration settings 208-1, and in response to detecting that the wireless communications 131 are received at the high signal strength, the display management resource 142 retrieves the personalized content guide 555-1 (from configuration settings 208-1) and displays it on the display screen 130. The user 108-1 is then able to use the remote control device 120 to select one or more control options in the content guide 555-1 displayed on the display screen 130 to control playback of respective content using playback device 140.

Assume further in this example embodiment, that the user 108-1 presses a respective button on the remote control device 120 to select displayed control option #2. In such an instance, the playback management resource 142 executes the control option #2. Accordingly, the user 108-1 benefits from the display of the personalized content guide 555-1 on the display screen 130.

In accordance with further embodiments, note that configuration settings assigned to a respective user can indicate a particular function to execute on behalf of the corresponding user upon selection of a respective button on the remote control device 120. For example, the control settings 208-1 assigned to the user 108-1 can be configured to indicate to display Joe's stored DVR content (which is different than Mary's store DVR content) in response to detecting a respective DVR button on the remote control device 120 when Joe is the controlling user. Thus, detection of breast buttons on the remote control device 120 results in execution of the different operations depending upon who is determined (as determined by the wireless station 125) to be operating the remote control device 120.

Figure 6:
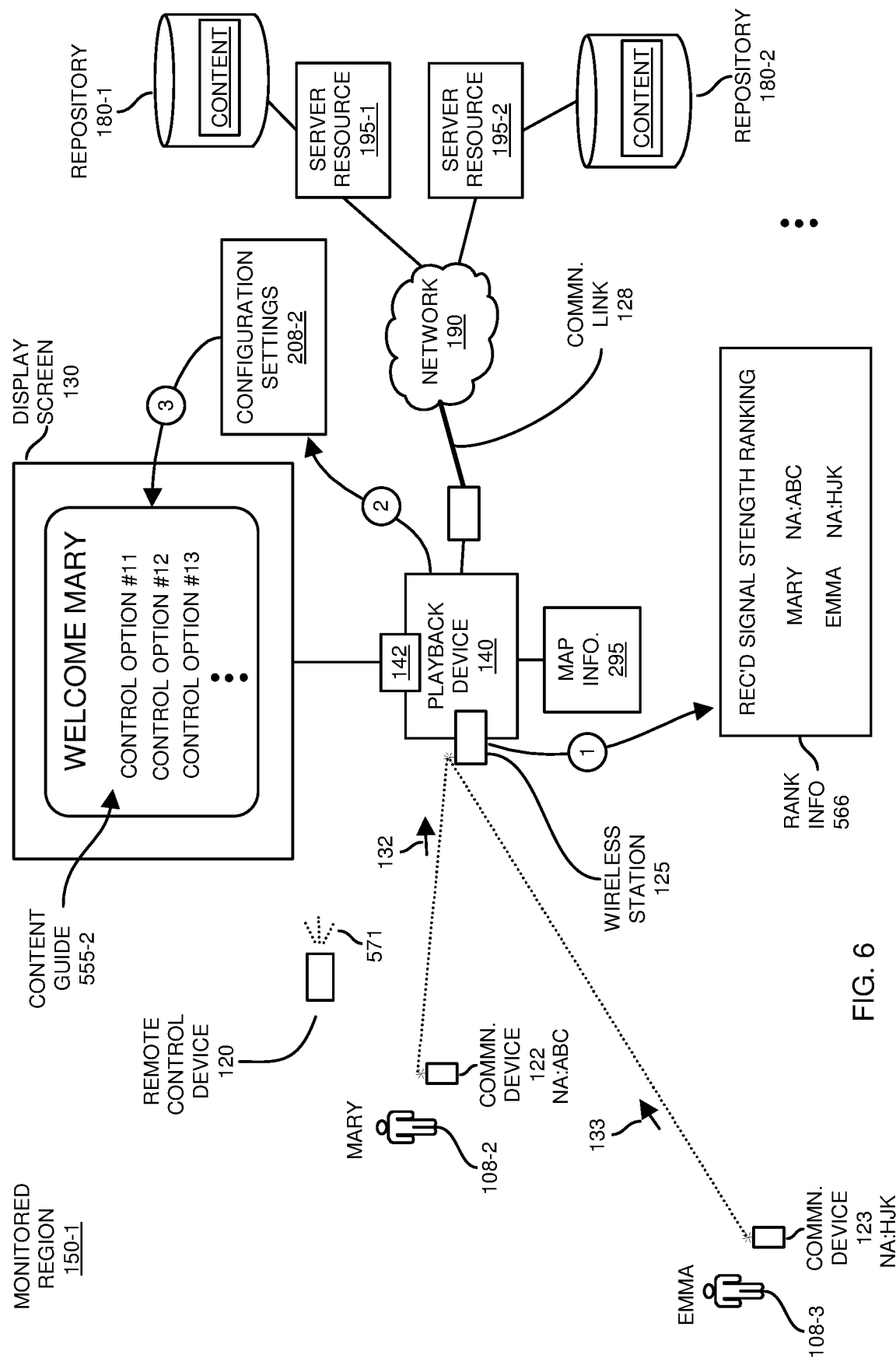
FIG. 6 is an example diagram illustrating detection of a second user in a monitored region and display of a respective personalized content guide associated with the second user according to embodiments herein.

FIG. 6 is an example diagram illustrating detection of a second user in a monitored region and display of a respective personalized content guide associated with the second user according to embodiments herein.

As shown in this example embodiment, user 108-2 possesses communication device 122; user 108-3 possesses communication device 123. Each of the users including user 108-2 and user 108-3 reside in the monitored region 150-1.

Communication device 122 transmits wireless communications 132 (one or more messages) in the monitored region 150-1. The wireless station 125 receives and analyzes the wireless communications 132 to determine that the wireless communications 132 are transmitted by communication device 122 assigned the network address ABC. In other words, the wireless station 125 analyzes data in the received wireless communications 132 and determines that the wireless communications 132 include network address ABC as a source transmitting the wireless communications 132. The wireless station 125 records a respective wireless signal strength of receiving the wireless communications 132.

Communication device 123 transmits wireless communications 133 (one or more messages) in the monitored region 150-1. The wireless station 125 receives and analyzes the wireless communications 133 to determine that the wireless communications 133 are transmitted by communication device 123 assigned the network address HJK. In other words, the wireless station 125 analyzes data in the received wireless communications 133 and determines that the wireless communications 133 include network address HJK as a source transmitting the wireless communications 133. The wireless station 125 records a respective wireless signal strength of receiving the wireless communications 133.

In a manner as previously discussed, in this instance, the wireless station 125 or other suitable resource produces rank information 566 indicating a signal strength from which the respective wireless communications are received from the communication devices in the monitored region 150-1. In this example embodiment, the rank information 566 indicates that the wireless communication 132 received from the user 108-2 (Mary) was higher in signal strength than received wireless communications 133.

In this embodiment, it is assumed that the user 108-2 is closest in proximity to the wireless station 125 because the wireless station 125 receives a highest signal strength from the communication device 122, indicating that the user 108-2 is controlling operation of playing back content on the display screen 130. In response to detecting that the wireless communications 132 are received at the highest signal strength, the display management resource 142 maps the network address ABC to configuration settings 208-2 in map information 295 (FIG. 2).

Using the configuration settings 208-2, in response to detecting that the wireless communications 132 are received at the high signal strength, the display management resource 142 retrieves the personalized content guide 555-2 (from configuration settings 208-2) and displays it on the display screen 130. The user 108-2 is then able to use the remote control device 120 to select one or more control options in the content guide 555-2 displayed on the display screen 130 to control playback of respective content using playback device 140.

Assume further in this example embodiment, that the user 108-1 presses a respective button on the remote control device 120 to select control option #13. In such an instance, the playback management resource 142 executes the control option #13. Accordingly, the user 108-2 benefits from the display of the personalized content guide 555-1 on the display screen 130.

As previously discussed, note again that configuration settings assigned to a respective user can indicate a particular function to execute on behalf of the corresponding user upon selection of the button on the remote control device 120. For example, the control settings 208-2 assigned to the user 108-2 may indicate to display Mary's stored DVR content page (which is different than Joe's stored DVR content page) in response to detecting a respective DVR button on the remote control device 120 when Mary is the controlling user. Accordingly, the (playback device's) response to pressing of a respective DVR button on the remote control device 120 performs a different operation depending upon which of the multiple communication devices is detected as a controlling device/user in the monitored region 150-1. In one embodiment, the playback device 140 initiates display of the DVR content page associated with recordings by user 108-2. Accordingly, the user 108-2 is able to more quickly view their personalized content available for selection playback.

Figure 7:
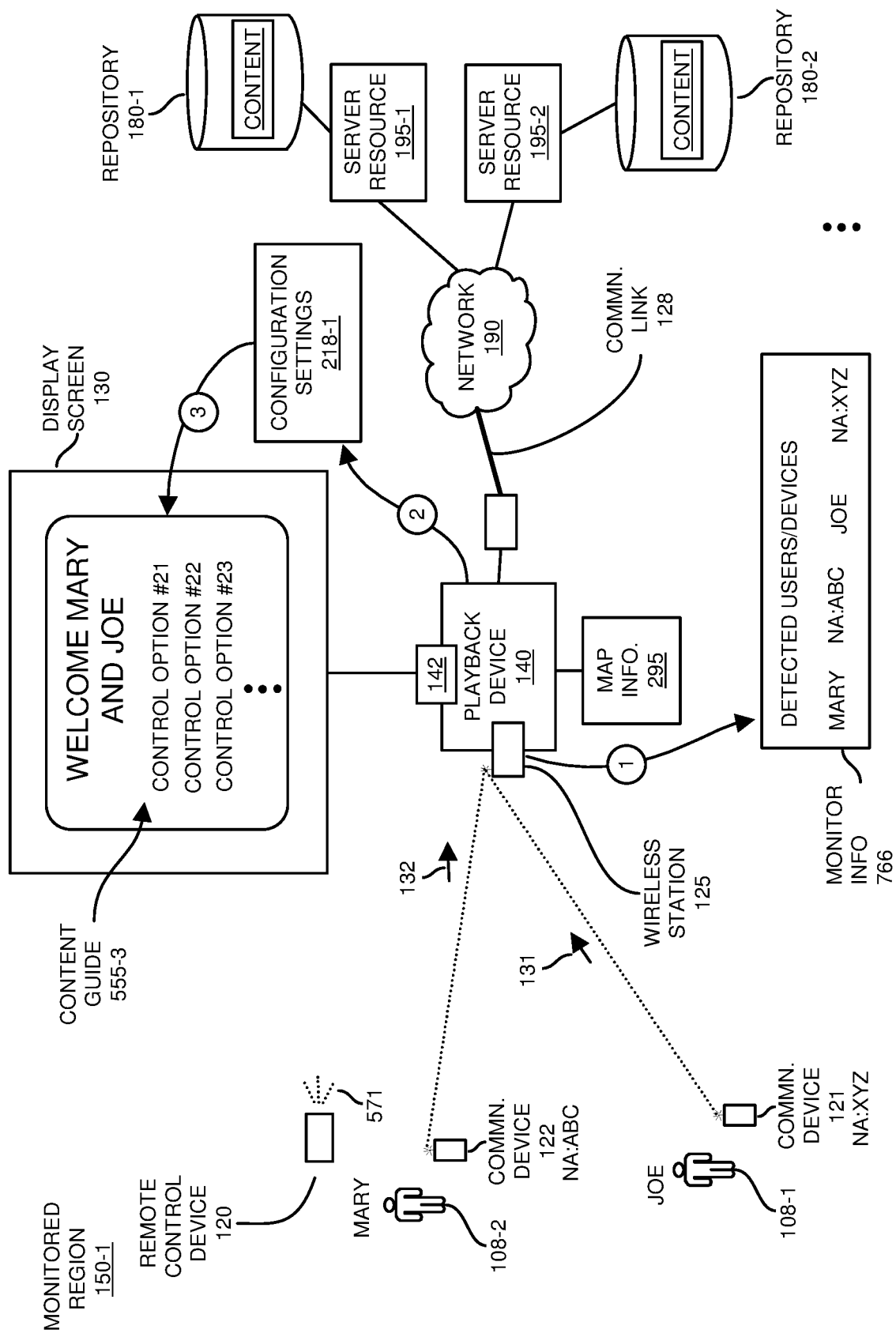
FIG. 7 is an example diagram illustrating detection of a first group of multiple users in a monitored region and display of an appropriate content guide associated with the first group according to embodiments herein.

FIG. 7 is an example diagram illustrating detection of a group of multiple users in a monitored region and display of an appropriate content guide associated with the group according to embodiments herein.

As shown, user 108-2 possesses communication device 122; user 108-1 possesses communication device 121. Each of the users including user 108-2 and user 108-1 reside in the monitored region 150-1.

Communication device 121 transmits wireless communications 131 (one or more messages) in the monitored region 150-1. In a manner as previously discussed, the wireless station 125 receives and analyzes the wireless communications 131 to determine that the wireless communications 131 are transmitted by communication device 121 assigned the network address XYZ. In other words, the wireless station 125 analyzes an appropriate data field in the received wireless communications 131 and determines that the wireless communications 131 include network address ABC as a source transmitting the wireless communications 131. The wireless station 125 records a respective wireless signal strength of receiving the wireless communications 131.

Communication device 122 transmits wireless communications 132 (one or more messages) in the monitored region 150-1. The wireless station 125 receives and analyzes the wireless communications 132 to determine that the wireless communications 132 are transmitted by communication device 122 assigned the network address ABC. In other words, the wireless station 125 analyzes data in the received wireless communications 132 and determines that the wireless communications 132 include network address ABC as a source transmitting the wireless communications 132. The wireless station 125 records a respective wireless signal strength of receiving the wireless communications 132. Assume that the signal strength of communications indicates that both of the user 108-1 and user 108-2 reside in a family room in which the display screen 130 resides for viewing.

The wireless station 125 or other suitable resource produces monitor information 766. In this example embodiment, the monitor information 766 indicates that the wireless station 125 detects presence of user 108-1 and user 108-2 in the monitored region 150-1 such as a family room.

In one embodiment, it is assumed that the group including user 108-2 and user 108-1 are watching the display screen 130 together. Using map information 295, the display management resource 142 maps a combination of the detected user 108-1 and user 108-2 (identified group) to corresponding configuration settings 218-1.

In accordance with the configuration settings 218-1, in response to detecting the combination of users 108-1 and 108-2 in the monitored region 150-1, the management resource 142 retrieves the personalized content guide 555-3 (from configuration settings 218-1) and displays it on the display screen 130. The user 108-2 is then able to use the remote control device 120 to select one or more control options in the content guide 555-3 displayed on the display screen 130 to control playback of respective content using playback device 140.

Assume further in this example embodiment, that the user 108-1 presses a respective button on the remote control device 120 to select control option #21. In such an instance, the playback management resource 142 executes the control option #21. Accordingly, the combination of users benefits from the display of the personalized content guide 555-1 on the display screen 130 via detection of the wireless communications 131 from the communication device 121 disposed in proximity to the user 108-1.

In a manner as previously discussed, note that the configuration settings 218-1 can indicate a particular operation to be performed in response to receiving selection of a specific button on the remote control device 120. Accordingly, the configuration settings 218-1 can be implemented in any number of different ways.

Figure 8:
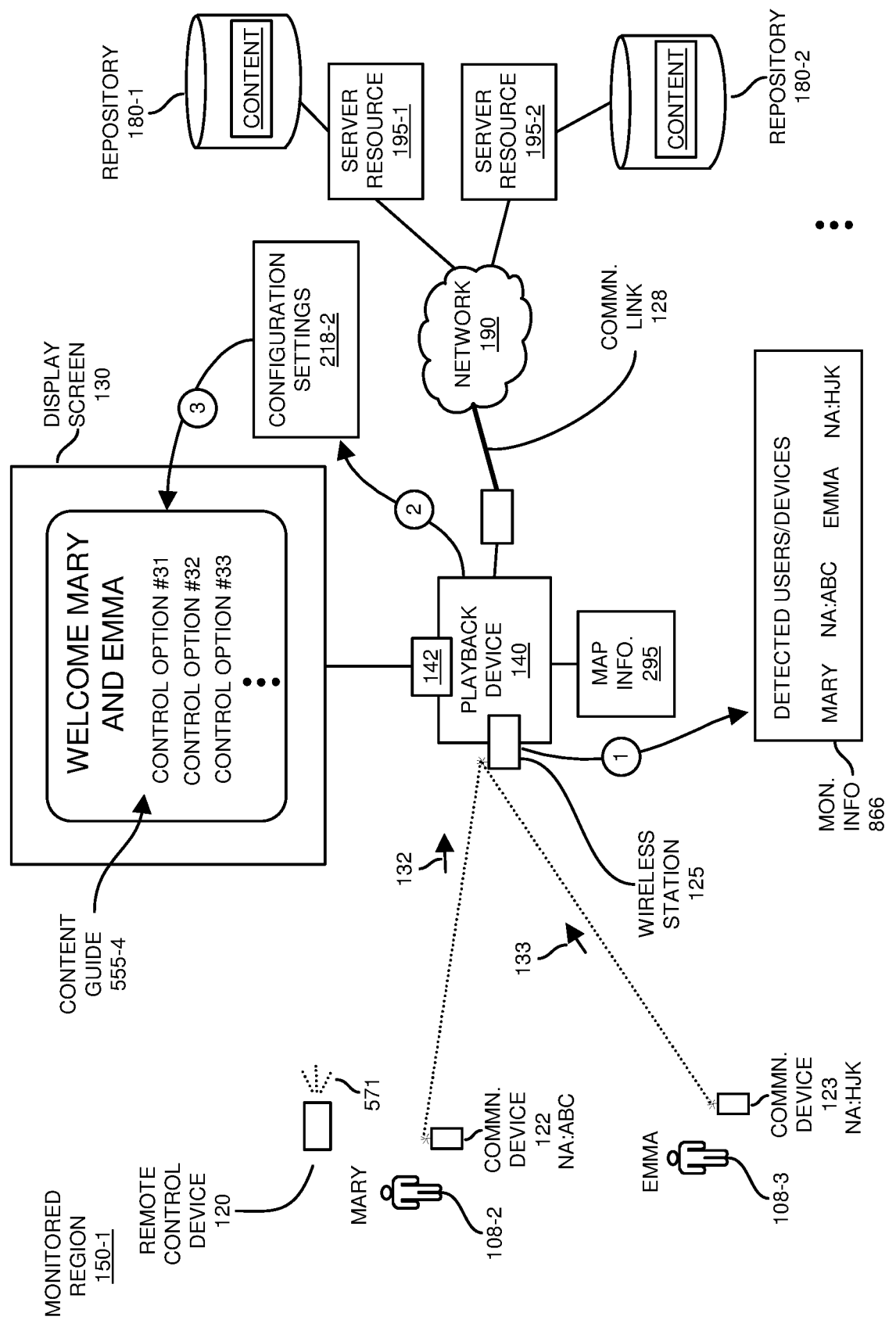
FIG. 8 is an example diagram illustrating detection of a second group of multiple users in a monitored region and display of an appropriate content guide associated with the second group according to embodiments herein.

FIG. 8 is another example diagram illustrating detection of a group of multiple users in a monitored region and display of an appropriate content guide associated with the group according to embodiments herein.

As shown, user 108-2 possesses communication device 122; user 108-3 possesses communication device 123. Each of the users including user 108-2 and user 108-3 reside in the monitored region 150-1.

As previously discussed, communication device 122 transmits wireless communications 132 (one or more messages) in the monitored region 150-1. The wireless station 125 receives and analyzes the wireless communications 132 to determine that the wireless communications 132 are transmitted by communication device 122 assigned the network address ABC. In other words, the wireless station 125 analyzes data in the received wireless communications 132 and determines that the wireless communications 132 include network address ABC as a source transmitting the wireless communications 132. The wireless station 125 records a respective wireless signal strength of receiving the wireless communications 132.

Further, as previously discussed, communication device 123 transmits wireless communications 133 (one or more messages) in the monitored region 150-1. The wireless station 125 receives and analyzes the wireless communications 133 to determine that the wireless communications 133 are transmitted by communication device 123 assigned the network address XYZ. In other words, the wireless station 125 analyzes data in the received wireless communications 133 and determines that the wireless communications 133 include network address ABC as a source that transmits the wireless communications 133. The wireless station 125 records a respective wireless signal strength of receiving the wireless communications 133.

The wireless station 125 or other suitable resource produces monitor information 866. In this example embodiment, the monitor information 866 indicates that the wireless station 125 detects presence of user 108-2 and user 108-3 in the monitored region 150-1.

In one embodiment, it is assumed that the group including user 108-2 and user 108-3 are watching the display screen 130 together. The display management resource 142 maps an identified group including a combination of the detected user 108-2 and user 108-3 to corresponding configuration settings 218-2.

Using the configuration settings 218-2, and in response to detecting the combination of users 108-2 and 108-3, the display management resource 142 retrieves and/or derives the personalized content guide 555-4 (from configuration settings 218-2) and displays it on the display screen 130. The user 108-2 is then able to use the remote control device 120 to select one or more control options in the content guide 555-4 displayed on the display screen 130 to control playback of respective content using playback device 140.

Assume further in this example embodiment, that the user 108-2 presses a respective button on the remote control device 120 to select control option #33. In such an instance, the playback management resource 142 executes the control option #33. Accordingly, the combination of users 108-2 and 108-3 benefits from the display of the personalized content guide 555-4 on the display screen 130.

In a manner as previously discussed, note that the configuration settings 218-2 can indicate a particular operation to be performed in response to receiving selection of a specific button on the remote control device 120. Accordingly, the configuration settings 218-2 can be implemented in any number of different ways.

Figure 9:
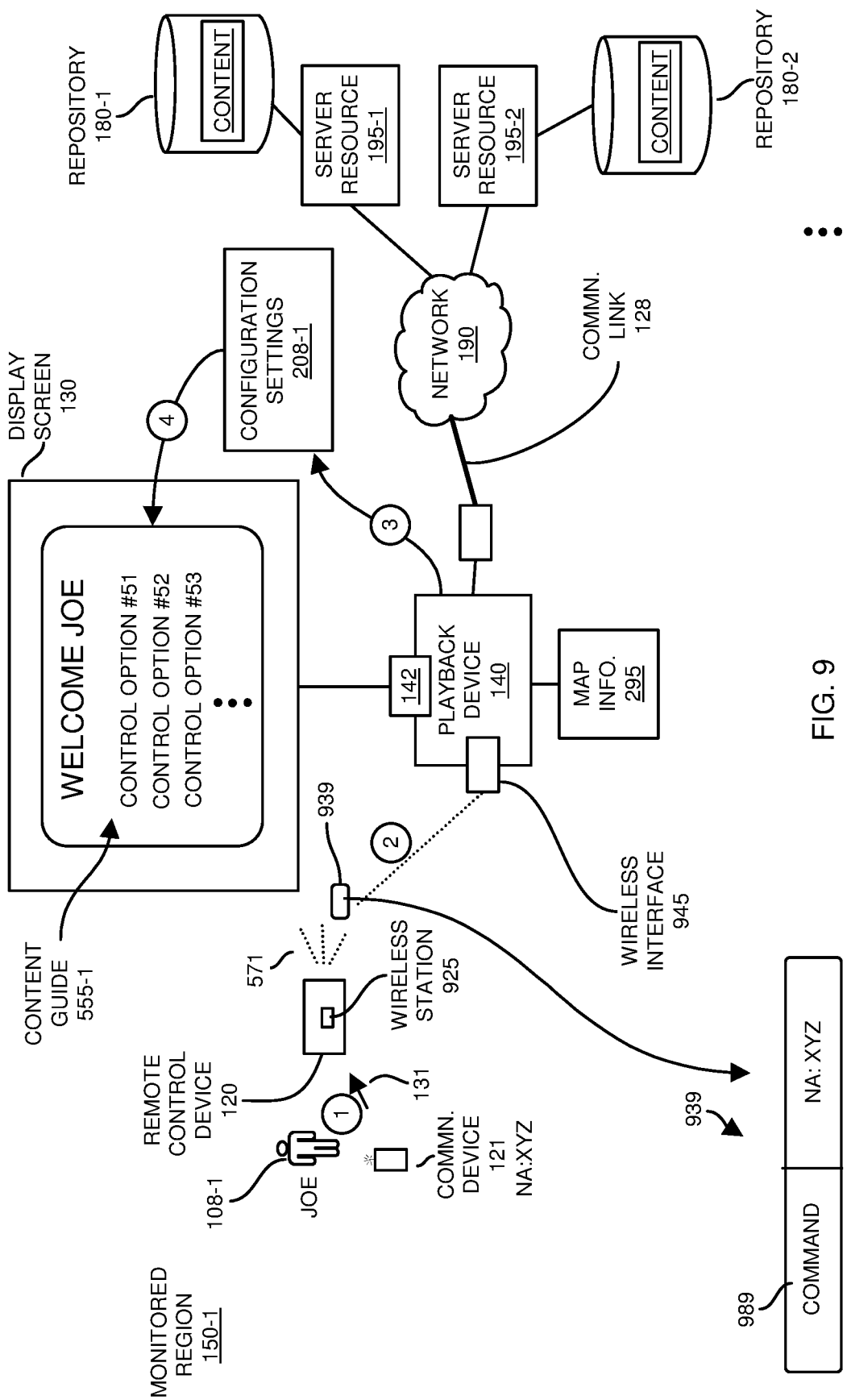
FIG. 9 is an example diagram illustrating a technique of enhancing use of a playback device according to embodiments herein.

FIG. 9 is an example diagram illustrating operation of a wireless station and a remote control device according to embodiments herein.

As previously discussed, the monitored region 150-1 can include a wireless station 125 to enhance control capability in network environment 100.

Note that the wireless station can be disposed at any location or disposed in any suitable device. For example, in this particular example embodiment, the wireless station 925 is disposed in the remote control device 120. Wireless station 925 can be configured to perform any of the operations as previously discussed with respect to wireless station 125. However, wireless station 925 is disposed in the remote control device 120, as shown, and is thus mobile. In other words, the user remote control device 120 is movable by a respective user in the monitored region 150-1.

By way of non-limiting example embodiment, the remote control device 120 can be powered be a respective battery. In such an instance, it is desirable to reduced power consumption so as not to deplete energy stored in the battery. To this end, the remote control device 120 can be configured to depower the wireless station 925 when the remote control device 120 is not used (such as when no buttons have been press over there is no detected movement of the remote control device 120 for a predetermined amount of time).

The remote control device 120 can include one or more sensor devices that detect when the remote control device 120 is being operated or about to be operated.

For example, the remote control device 120 can include a motion sensor that monitors motion of the remote control device 120. When the user picks up (moves) the remote control device 120, the motion sensor detects the movement and activates the wireless station 925 to monitor communications in the monitored region 150-1. Thus, the wireless station 925 can be selectively powered depending on use of the remote control device 120.

Note that as an alternative to detecting motion, embodiments herein can include detecting pressing of a button on the mobile communication device 120, which results in activation of the wireless station 925.

Accordingly, any trigger event (motion pressing of a button, etc.) can be used to activate the wireless station 925.

In a manner as previously discussed with respect to wireless station 125, subsequent to being powered based upon a trigger event such as detecting motion, pressing of a button on the remote control device 120, etc., the wireless station 925 monitors the monitored region 150-1 for the presence of one or more communication devices.

In this example embodiment, the user 108-1 possesses communication device 121 in nearest proximity to the remote control device 120. Communication device 121 transmits wireless communications 131 (one or more messages) in the monitored region 150-1.

The wireless station 925 receives and analyzes the wireless communications 131 to determine that the wireless communications 131 are transmitted by communication device 121 assigned the network address XYZ. In other words, the wireless station 925 analyzes data in the received wireless communications 131 and determines that the wireless communications 131 include network address XYZ as a source transmitting the wireless communications 131. The wireless station 925 can be configured to record a respective wireless signal strength of receiving the wireless communications 131.

If there are other communication devices and the monitored region 150-1, the wireless station 925 or other suitable resource can be configured to produce rank information indicating a signal strength from which the respective wireless communications are received from each of the communication devices in the monitored region 150-1.

In this example embodiment, assume that the rank information indicates that the wireless communications 131 received from the communication device 121 (operated by Joe) was higher in signal strength than wireless communication received from any of the device. It is assumed that the user Joe operates the remote control device 121.

Inclusion of the wireless station 925 in the remote control device 120 is beneficial because it is likely that the communication device 121 nearest the remote control device 120 indicates a corresponding user operating the remote control device 120.

Subsequent to the wireless station 925 learning the network address (XYZ) of the nearest device, the user 108-1 presses one or more respective buttons on the remote control device 120 indicating how to control the respective playback device 140.

Via the wireless signals 571, the remote control device 120 transmits the user-selected commands (corresponding to the pressed buttons of the remote control device 120) to the display management resource 142. As previously discussed, the buttons can perform a different function depending on respective configuration settings.

In one embodiment, in addition to wirelessly transmitting a respective command 989 from the remote control device 120 to the wireless interface 945, the remote control device 120 is operable to transmit the detected network address XYZ of the communication device 121 in the wireless communication 939 from the remote control device 120 to the wireless interface 945. Accordingly, the playback device 140 (and or display manager resource 142) receives notification of selected commands as well as a network address XYZ of the communication device 121 nearest the remote control device 120.

Information such as command 989 in the network address XYZ can be communicated from the remote control device 120 to the playback device 140 in any suitable manner. For example, in one embodiment, the wireless station 925 communicates the network address XYZ of the detected communication device 121 to the wireless access point of the playback device 140 over a first wireless communication link (such as a WiFi™ communication link) established between the wireless station 925 and a wireless access point in the playback device 140. The remote control device 120 transmits a separate wireless signal (such as an infrared signal) to the wireless interface 945, the signal indicating the respective selected command 989 to the wireless interface 945 of the playback device 140.

Alternatively, note that the remote control device 120 can be configured to transmit the communication 939 as a single message including the command 989 and corresponding network address XYZ. The playback device 140 processes the received communication 939 to learn of the command 989 and network address XYZ of the user operating the remote control device 120.

In either case, the playback device 140 is notified of the selected command 989 as well as the network address XYZ of the communication device associated with the user operating the remote control device 120.

In a manner as previously discussed, via the communication 939 (which may be a single communication or multiple communications), display management resource 142 receives notification of the selected commands as well as the network address XYZ of the communication device 121. For example, via presence of the network address XYZ in at least one communication received from the remote control device 120, the display management resource 142 of the playback device 140 knows that the remote control device 120 is operated by the user 108-1. To provide enhanced playback of content, the display manager resource 142 maps the network address XYZ to configuration settings 208-1 in map information 295 (FIG. 2).

As previously discussed, using the configuration settings 208-1, the display management resource 142 produces the personalized content guide 555-1 (from configuration settings 208-1) and displays it on the display screen 130. The user 108-1 is then able to use the remote control device 120 to select one or more additional control options in the content guide 555-1 displayed on the display screen 130 to control playback of respective content using playback device 140.

Assume further in this example embodiment, that the user 108-1 presses a respective button on the remote control device 120 to select control option #52. In such an instance, the playback management resource 142 executes the control option #52. Accordingly, the user 108-1 benefits from the display of the personalized content guide 555-1 on the display screen 130.

As previously discussed, as an alternative to displaying the personalized content guide 555-1 associated with the user 108-1, the display manager resource 142 can be configured to use the configuration settings 208-1 to identify what function to perform when a respective user 108-1 presses a corresponding button on the remote control device 120. For example, as previously discussed, the configuration settings 208-1 can indicate to display the users 108-1 DVR recordings when the user presses a predetermined corresponding DVR button on the remote control device 120. For a different detected user such as a second user, the playback device would display the personalized content guide associated with the second user.

Accordingly, knowing identity of a respective user operating the remote control device 120 provides enhanced control capability for the corresponding user 108-1.

Figure 10:
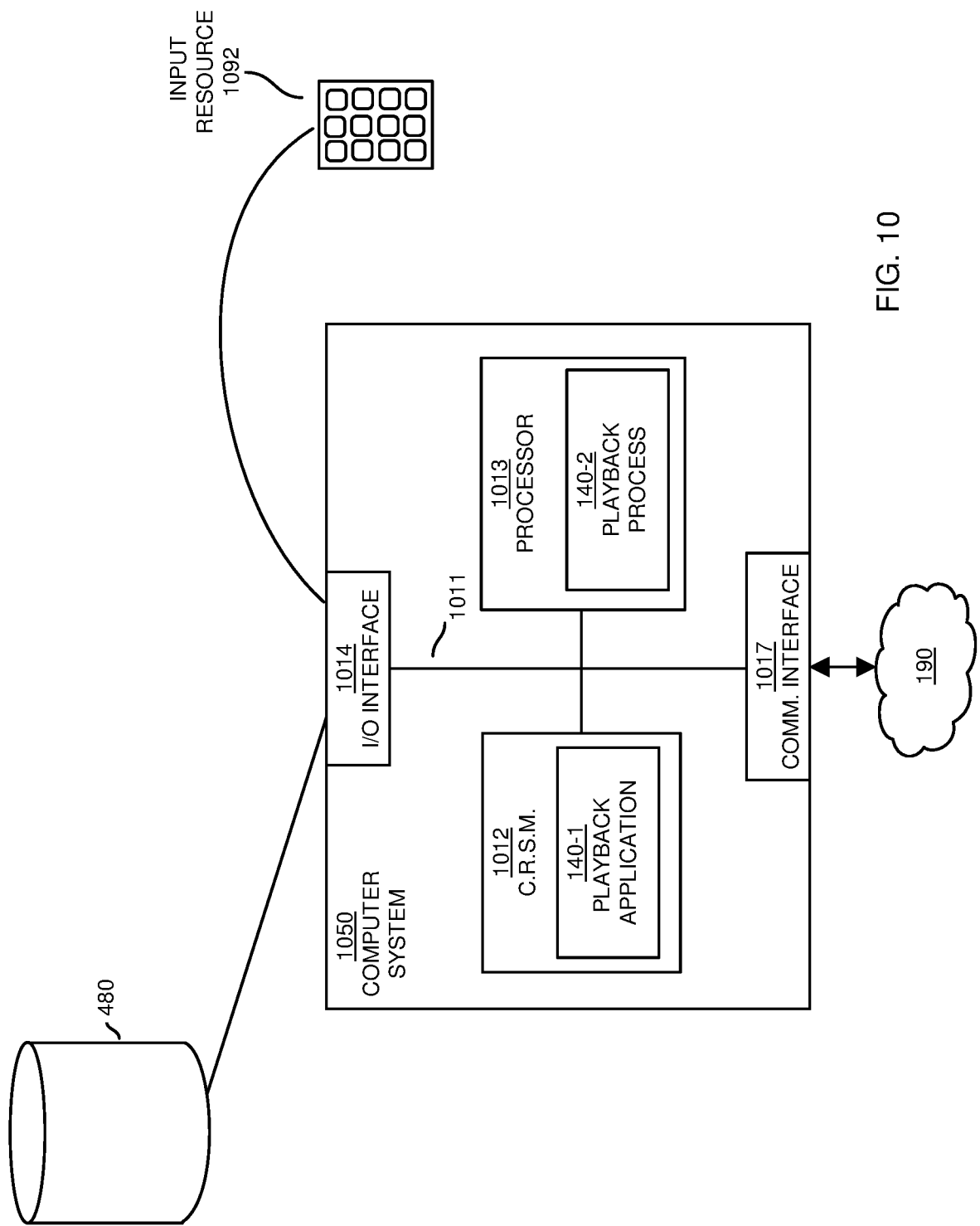
FIG. 10 is a diagram illustrating an example computer architecture to execute operations according to embodiments herein.

FIG. 10 is an example block diagram of a computer system for implementing any of the operations as discussed herein according to embodiments herein.

Any of the resources as discussed herein can be configured to include a processor and executable instructions to carry out the different operations as discussed herein.

As shown, computer system 1050 (such as a respective server resource) of the present example can include an interconnect 1011 that couples computer readable storage media 1012 such as a non-transitory type of media (i.e., any type of hardware storage medium) in which digital information can be stored and retrieved, a processor 1013, I/O interface 1014, and a communications interface 1017.

I/O interface 1014 supports connectivity to repository 480 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with playback application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in playback application 140-1 stored on computer readable storage medium 1012. Execution of the playback application 140-1 produces playback process 140-2 to carry out any of the operations and/or processes as discussed herein.

Those skilled in the art will understand that the computer system 1050 can include other processes and/or software and hardware components, such as an operating system that controls allocation and use of hardware resources to playback application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 11. Note that the steps in the flowcharts below can be executed in any suitable order.

Figure 11:
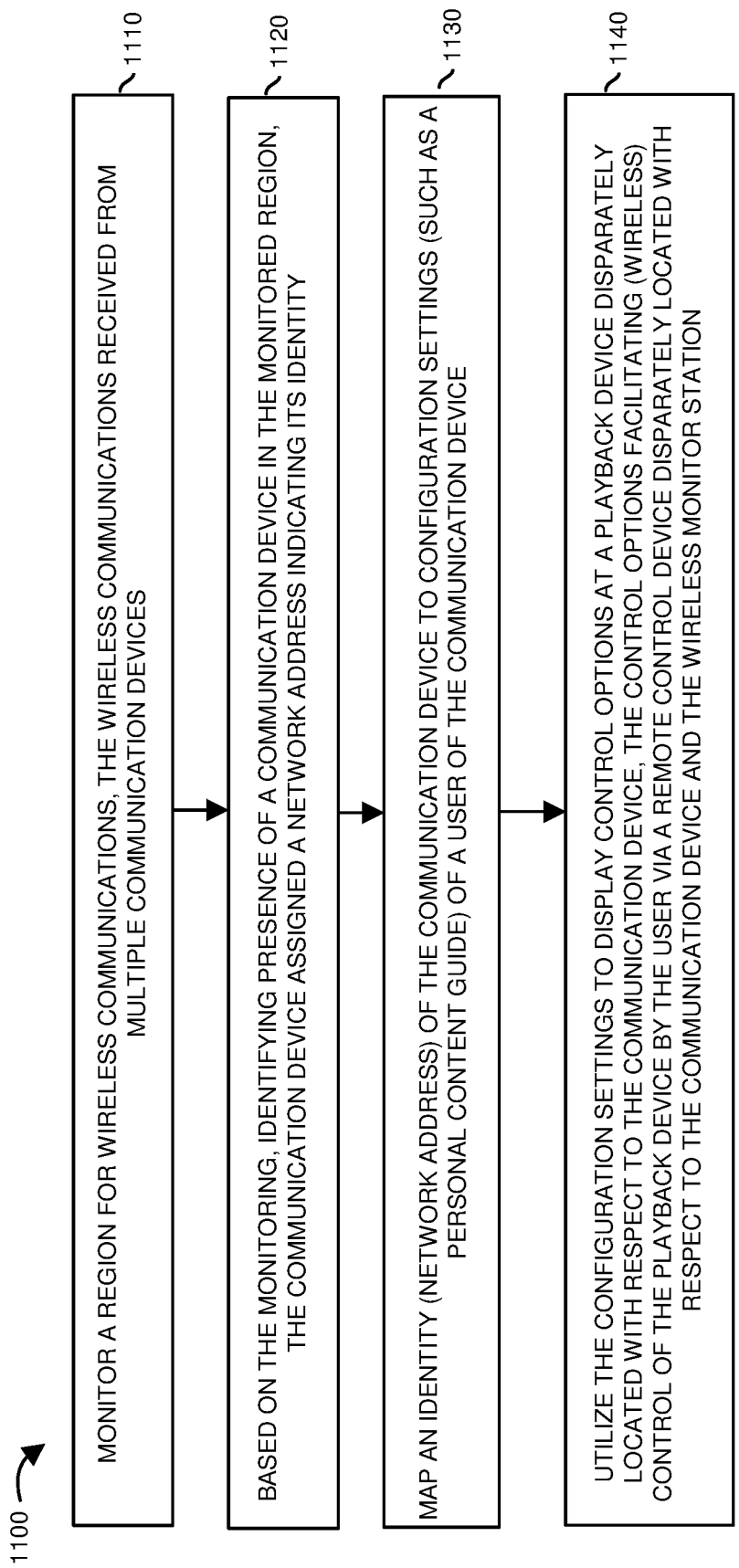
FIG. 11 is an example diagram illustrating a method according to embodiments herein.

FIG. 11 is a flowchart 1100 illustrating an example method according to embodiments. Note that there will be some overlap with respect to concepts as discussed above.

In processing operation 1110, the wireless station 125 monitors a region 150-1 for wireless communications 131, 132, 133, etc., transmitted by multiple communication devices.

In processing operation 1120, based on the monitoring, the wireless station 125 identifies presence of communications device 121 in the monitored region 150-1. The communication device 121 is assigned network address XYZ indicating its identity.

In processing operation 1130, the display management resource 142 or other suitable resource such as a mapper resource maps an identity (such as network address XYZ or other unique identifier value) of the communication device 121 to configuration settings 208-1 (such as a personal content guide, personal settings, etc.) of a user 108-1 of the communication device 121.

In processing operation 1140, the playback device 140 utilizes the configuration settings 208-1 to identify and display control options (such as control option #1, control option #2, controller option #3, etc.) at the playback device 140, which is disparately located with respect to the communication device 121 in the possession of the user 108-1. As previously discussed, the control options on the display screen 130 facilitate (wireless) control of the playback device 140 by the user 108-1 via a remote control device 120 disparately located with respect to the communication device 121 and the wireless monitor station 125.

Note again that techniques herein are well suited to facilitate control of a playback device or other suitable resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
via computer processor hardware, executing operations of:
at a wireless station, monitoring a region for wireless communications to identify presence of a communication device in the monitored region;
during the monitoring, detecting a wireless communication transmitted from the communication device to a destination communication device other than the wireless station;
mapping an identity of the communication device as indicated by the wireless communication to configuration settings of a user of the communication device; and
utilizing the configuration settings at a playback device to facilitate control of the playback device by the user, the playback device disparately located with respect to the communication device;
wherein the wireless station is disposed in a remote control device disparately located with respect to both the communication device and the playback device, the remote control device operated by the user to control the playback device;
wherein detecting the wireless communication includes: receiving the identity of the communication device in a wireless message from the remote control device; and
wherein the remote control device produces the wireless message to include the identity of the communication device, the remote control device communicating the wireless message to the playback device in response to the user selecting a button of the remote control device.

2. The method as in claim 1, wherein the identity is a network address retrieved from the wireless communication transmitted by the communication device in the monitored region; and
wherein mapping the identity of the communication device to configuration settings includes mapping the network address to the configuration settings of the user.

3. The method as in claim 1, wherein the configuration settings are assigned to the user, the method further comprising:
via receipt of multiple wireless communications in the monitored region, detecting identities of multiple users operating respective communication devices in the monitored region; and
in response to identifying that the user operating the communication device is ranked highest in priority amongst the multiple users, utilizing the configuration settings assigned to the user to display control options on a display screen of the playback device.

4. The method as in claim 1, wherein the communication device is a first communication device, the method further comprising:
detecting presence of multiple communication devices in the monitored region, the multiple communication devices including the first communication device and a second communication device;
mapping a combination of the first communication device and the second communication device to configuration settings assigned to the combination; and
utilizing the configuration settings assigned to the combination of the first communication device and the second communication device to display control options as indicated by the configuration settings assigned to the combination of the multiple communication devices.

5. The method as in claim 1, wherein the user selects the button of the remote control device to control the playback device.

6. The method as in claim 1, wherein selection of a button of the remote control device used to control the playback device results in activation of the wireless station to monitor the region for presence of wireless communications.

7. The method as in claim 1, wherein detected movement of the remote control device used to control the playback device results in activation of the wireless station and corresponding monitoring of the region for wireless communications.

8. The method as in claim 1, wherein lack of movement of the remote control device used to control the playback device results in depowering of the wireless station and discontinued monitoring of the region for presence of wireless communications.

9. A method comprising:
via computer processor hardware, executing operations of:

at a wireless station, monitoring a region for wireless communications to identify presence of a communication device in the monitored region;

during the monitoring, detecting a wireless communication transmitted from the communication device to a destination communication device other than the wireless station;

mapping an identity of the communication device as indicated by the wireless communication to configuration settings of a user of the communication device; and utilizing the configuration settings at a playback device to facilitate control of the playback device by the user, the playback device disparately located with respect to the communication device;

prior to detecting the wireless communication, notifying the user to place the communication device at a particular location with respect to the wireless station;

at the wireless station, receiving a wireless message from the communication device, the wireless message including a unique identifier value assigned to the communication device; and initiating display of a notification amongst multiple notifications displayed on a display screen of the playback device, the notification indicating detection of the unique identifier value.

10. The method as in claim 9 further comprising:

receiving the configuration settings, the configuration settings associated with the user;

receiving selection of the notification amongst multiple notifications, each of which corresponds to receipt of a respective wireless communication from a different communication device, the selection of the notification indicating that configuration settings associated with the user are to be assigned to the unique identifier value assigned to the communication device; and in response to receiving selection of the notification, assigning the unique identifier value to the received configurations settings.

11. A method comprising:

receiving an identity of a communication device in a wireless message transmitted from a remote control device, the remote control device operated by a user to control a playback device, the remote control device including a wireless station that detects a wireless communication from the communication device, the wireless communication indicating the identity included in the wireless message;

mapping the identity of the communication device as indicated by the wireless message to configuration settings assigned to the user of the communication device; and utilizing the configuration settings of the user to control the playback device; and wherein the remote control device generates the wireless message in response to the user selecting a button of the remote control device.

12. The method as in claim 11, wherein the user selects the button of the remote control device to control the playback device, the wireless message including control information that controls the playback device.

13. The method as in claim 11, wherein detected movement of the remote control device results in powering of the wireless station to monitor a region for wireless communications.

14. The method as in claim 11 further comprising:

at the wireless station, detecting presence of multiple communication devices in the monitored region;

identifying the communication device as being a particular one of the multiple communication devices from which a strongest wireless signal strength is received; and in response to detecting that the strongest wireless signal strength is received from the communication device, mapping the identity of the communication device to the configuration settings assigned to the user.

15. The method as in claim 11, wherein depressing of a button on the remote control device results in powering of the wireless station to monitor a region for wireless communications.

16. The method as in claim 11, wherein the identity is a network address assigned to the communication device.

17. The method as in claim 11, wherein utilizing the configuration settings includes:

providing notification on a display screen of the playback device, the notification indicating an identity of the user operating the communication device.

18. The method as in claim 11, wherein utilizing the configuration settings includes:

providing notification on a display screen of the playback device, the notification indicating different selectable control options associated with the configuration settings.

19. The method as in claim 18, wherein providing notification on the display screen includes:

displaying a first playback control option on the display screen; and displaying a second playback control option on the display screen.

20. The method as in claim 19 further comprising:

in response to detecting the user pressing a respective button on the remote control device selecting the second playback control option, executing the second playback control option.

* * * * *